(12) United States Patent
Gubricky et al.

(10) Patent No.: US 8,597,433 B2
(45) Date of Patent: Dec. 3, 2013

(54) APPARATUS AND PROCESS FOR SEPARATION OF LIQUID FROM A GAS

(75) Inventors: Peter Gubricky, Crest Hill, IL (US); Alex Degutis, La Grange Park, IL (US); Al Isenegger, Southgate, MI (US); Josh Chesser, Lockport, IL (US); Jim McLaughlin, Monee, IL (US); Clayton Strand, Bolingbrook, IL (US); Mike Dolan, Brecksville, OH (US)

(73) Assignee: Salco Products Inc., Lemont, IL (US)

( * ) Notice: Subject to any disclaimer, the term of this patent is extended or adjusted under 35 U.S.C. 154(b) by 614 days.

(21) Appl. No.: 12/749,090

(22) Filed: Mar. 29, 2010

(65) Prior Publication Data

US 2011/0146712 A1   Jun. 23, 2011

Related U.S. Application Data

(60) Provisional application No. 61/289,783, filed on Dec. 23, 2009.

(51) Int. Cl.
*B08B 7/04* (2006.01)
*B01D 50/00* (2006.01)
*B01D 59/50* (2006.01)

(52) U.S. Cl.
USPC ............... 134/12; 134/10; 134/11; 96/155; 96/339; 55/323; 55/333; 95/149; 95/273

(58) Field of Classification Search
USPC ............... 134/10, 11, 12; 55/333, 340, 323; 95/149, 155, 339, 423, 272; 164/5, 164/417; 96/155, 339
See application file for complete search history.

(56) References Cited

U.S. PATENT DOCUMENTS

| | | | |
|---|---|---|---|
| 3,375,058 A * | 3/1968 | Petersen et al. | 423/2 |
| 3,470,022 A * | 9/1969 | Ferner et al. | 134/3 |
| 4,138,470 A * | 2/1979 | Bolme | 423/394.2 |
| 4,144,040 A * | 3/1979 | Claes et al. | 95/273 |
| 4,899,789 A * | 2/1990 | Carow | 141/24 |
| 5,135,611 A * | 8/1992 | Cameron | 159/4.1 |

\* cited by examiner

*Primary Examiner* — Saeed T Chaudhry
(74) *Attorney, Agent, or Firm* — Leydig, Voit & Mayer, Ltd.

(57) ABSTRACT

A pickling process for descaling metal includes a two-stage filtering process to remove pickling liquor fog, mist, and/or vapors from a gas collected during the descaling process. The process includes a two-stage filtering arrangement that includes a first stage filter, which is arranged to remove a liquid phase of the pickling liquor from the gas, and a second stage filter, which is arranged to remove a gaseous phase of the pickling liquor the said gas. The recovered pickling liquor can advantageously be recycled for reuse because it is recovered in a relatively higher concentration that has heretofore been possible.

8 Claims, 4 Drawing Sheets

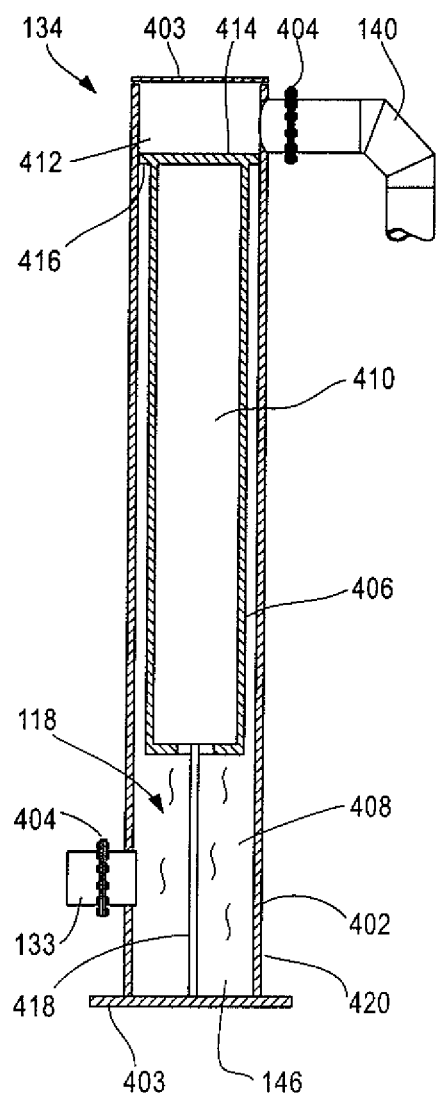
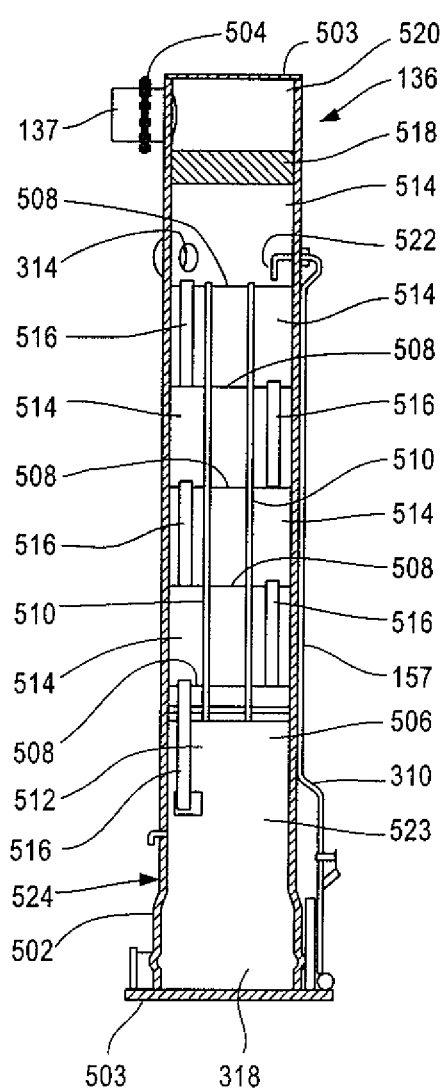

APPARATUS AND PROCESS FOR SEPARATION OF LIQUID FROM A GAS

CROSS-REFERENCE TO RELATED APPLICATION

This application claims priority, pursuant to Title 35 USC §119, to the filing date of U.S. Provisional Patent Application No. 61/289,783 filed Dec. 23, 2009.

FIELD OF THE INVENTION

The present disclosure relates to systems and processes for the treatment of metal and, more particularly, to the use and recovery of substances used for the surface treatment of continuous metal treatment processes.

BACKGROUND OF THE INVENTION

Certain hot working processes for metals, such as rolling of steel and other processes conducted at relatively high temperatures, often leave an oxide layer or scale on the surface of the material worked. Removal of such scale can be accomplished by use of acids that dissolve the scale. The process of removing scale from metal by use of acids is commonly known as "pickling" of the metal.

The most commonly used pickling acid is hydrochloric acid, although certain applications may include use of sulfuric acid. Hydrochloric acid is more expensive than sulfuric acid, but its pickling effect on the metal is faster. A certain amount of metal is typically lost during the pickling process. Hydrochloric acid pickling processes are known to advantageously minimize the amount of metal loss.

Modern metal production and processing facilities require high rates of production, which makes use of hydrochloric acid as the pickling solution more desirable because if its capability to quickly de-scale metal. Nevertheless, the relatively higher cost of hydrochloric acid makes such de-scaling processes more expensive to operate, especially since the rate of loss of hydrochloric acid during these processes is also relatively high.

In a typical pickling process, hot or warm metal is passed in a continuous fashion through a bath or under a shower of the pickling liquid. The pickling liquid wets and washes the surface of the metal, thus dissolving and removing the scale that has accumulated thereon. In the case of a shower application of the liquid, which is often conducted at a high pressure to aid in the quick removal of the scale, a certain amount of the sprayed fluid disperses into the atmosphere in the form of an aerosol solution. The aerosol solution may contain about 40 parts per million (PPM) of gaseous or evaporated acid components, and about 1160 PPM of acid fog or mist. Because of environmental considerations, the gaseous and aerosol components of the pickling liquid are removed from the bath and filtered to remove therefrom or recover as much of the acid as possible for re-use into the system.

Pickling sludge is the waste product from pickling, and includes acidic rinse waters, metallic salts and waste acid. Spent pickle liquid is collected and processed to recover useful compounds, for example, Ferric Chloride ($FeCl_3$), which can be resold to other industries for various uses, such as a coagulant in sewage treatment and drinking water production, an etchant for copper-based metals in printed circuit boards, and other applications.

Accordingly, there is a need to reduce waste of pickling liquids while also improving the yield and concentration of byproducts of the pickling process that have commercial value.

BRIEF SUMMARY OF THE INVENTION

The invention provides a pickling process for descaling metal that includes a two-stage filtering process to remove pickling liquor fog, mist, and/or vapors from a gas collected during the descaling process. The process includes a two-stage filtering arrangement that includes a first stage filter, which is arranged to remove a liquid phase of the pickling liquor from the gas, and a second stage filter, which is arranged to remove a gaseous phase of the pickling liquor of the collected gas. The recovered pickling liquor can advantageously be recycled for reuse because it is recovered in a relatively higher concentration that has heretofore been possible.

In one aspect, the disclosed process reduces the feed of fresh water to the treatment process for pickling liquor, thus increasing the concentration of the liquor as well as the concentration of ferric chloride. Thus, water consumption during the process is reduced relative to known processes to produce a more concentrated mixture of pickling liquor and ferric chloride.

BRIEF DESCRIPTION OF THE SEVERAL VIEWS OF THE DRAWINGS

FIG. 4 is a cross section of a candle-type filter in accordance with the disclosure.

FIG. 5 is a cross section of a tray-type filter in accordance with the disclosure.

DETAILED DESCRIPTION

Figure 1:
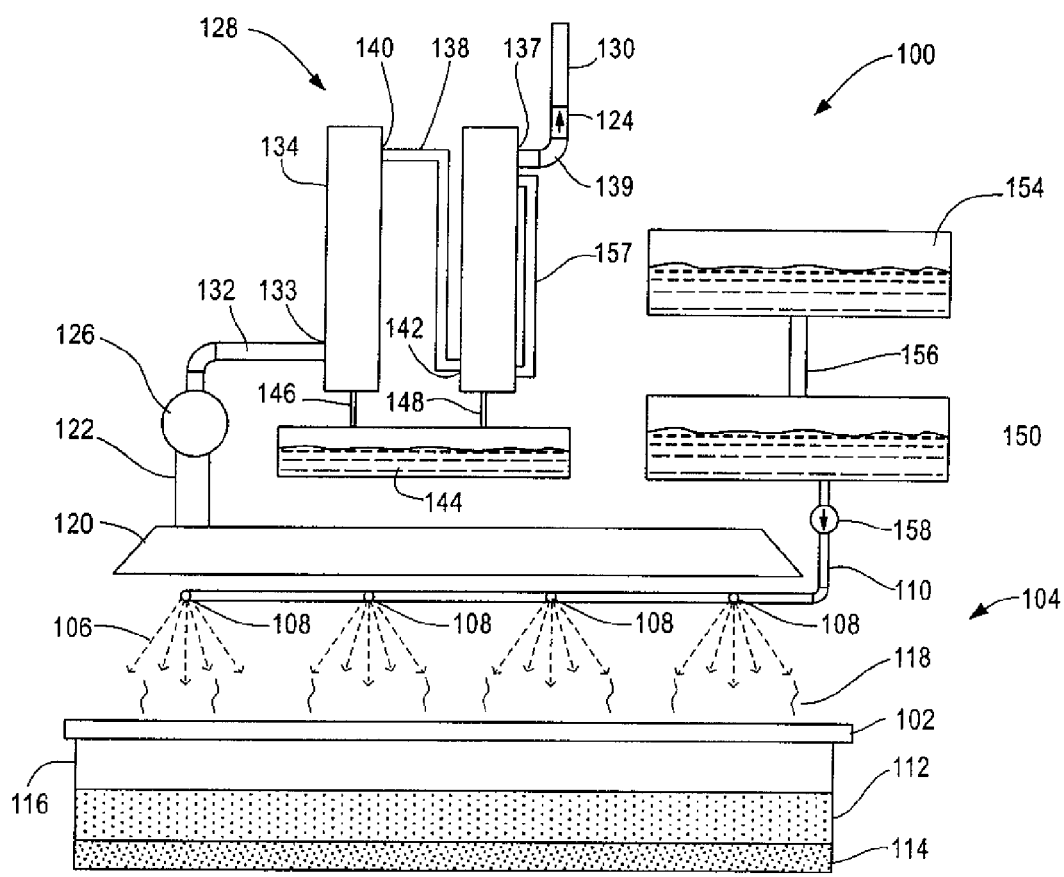
FIG. 1 is a schematic diagram of a pickling process and liquor recovery system in accordance with the disclosure.

A block diagram of a process 100 and system for de-scaling or pickling metal in a continuous fashion is shown in FIG. 1. The process 100 is shown relative to the de-scaling of metal stock 102, which can be any type of advancing or continuous metal in various forms, such as sheet metal, bars, and so forth. The process 100 includes a pickling station or reactor 104, which sprays a pickling liquor 106 onto the metal stock 102 as it passes through the reactor 104. In the illustrated embodiment, the reactor 104 includes a series of sprayers 108 that spray the pickling liquor 106, in this case, a mixture of water and hydrochloric acid, which is supplied to the sprayers 108 by a supply line 110.

The spraying liquor 106 washes over the top, bottom, and side surfaces of the metal stock 102 (in the illustration of FIG. 1 only the top sprayers 108 are illustrated for simplicity), and removes scaling and other contaminants or debris that have deposited thereon. In the case of steel, in particular, the hydrochloric acid component of the liquor 106 mixture reacts with iron oxides on the surface of the metal to yield Ferric Chloride. Used pickling liquor 112 draining from the surfaces of the metal stock 102, along with ferric chloride 114 in solution, are collected in a drain tank 116. The drain tank 116, which is open along its top side, is disposed beneath the sprayers 108 such that used pickling liquor 112 draining therefrom may be collected. Ferric chloride 114 in solution collects in the tank and is periodically removed. Used pickling liquor 112 is drawn from the tank 116, treated to remove ferric chloride 114, its hydrochloric acid concentration adjusted, and the liquor is recycled for reuse at the sprayers 108.

As previously described, gas 118, which contains hydrochloric acid in evaporated and/or in aerosol solution form, may be collected from the reactor 104 by a hood 120 disposed over the sprayers 108. In the illustrated embodiment, a single hood 120 is shown although numerous hoods disposed at various locations may be used. A gas conduit 122 is connected to the hood 120 and operates to collect the gas 118 from underneath and within the hood 120. Gas collection is accomplished by suction of the gas 118 under the force of a pump (or compressor) 124. In the illustration of FIG. 1, an optional manifold 126 is shown, which is connected to the gas conduit 122 and serves to interconnect the gas conduit 122 with other, similar gas conduits (not shown) when multiple hoods are used.

It can be appreciated that the gas 118 passing through the gas conduit 122 will have a relatively high pickling liquor content, e.g., hydrochloric acid, which can cause corrosion to mechanical equipment that it comes into contact with, such as the pump 124. Moreover, it is desired to remove as much of the pickling liquor from the gas 118 as possible, such that it can be recycled and reused. Thus, as shown, a filter arrangement 128 is disposed between the hood 120 and the pump 124. The filtering arrangement 128 advantageously removes pickling liquor from the gas 118 before it reaches the pump 124 and before it is subsequently released to the atmosphere through a stack 130. A supply conduit 132 fluidly connects the gas conduit 122 with an inlet 133 of the filter arrangement 128 to provide the gas 118 thereto for filtering, as is described in more detail hereafter.

The filter arrangement 128 is a two-stage filtering process that includes a first filter stage, having a first filter 134 and a second filter stage having a second filter 136. The gas 118 is pulled sequentially through the first and second filters 134 and 136 by the pump 124 through an outlet 137 of the filter arrangement 128 and via an outlet conduit 139 before being expelled through the stack 130. A transfer conduit 138 fluidly connects an outlet 140 of the first filter 134 with an inlet 142 of the second filter 136.

In the illustrated embodiment, the first filter 134 is of the type commonly referred to as a candle-type filter or, simply, a candle filter. Candle filters typically include or more columnar filter elements sealed within a sealed vessel. As such, filtration is contained within the vessel. The second filter 136 is of the type commonly referred to as a tray-type filter or, simply, a tray filter. Tray filters can be of many different types. As illustrated, the second filter 136 has one or more filtering elements enclosed within a sealed vessel, as is described in more detail below.

During operation, the first and second filters 134 and 136 operate to remove pickling liquor from the gas 118. The first filter 134 is primarily used to knock out or coagulate the pickling liquor that is still in liquid phase and dispersed as a fog or mist in the gas 118. The pickling liquor thus removed is collected in a recycling reservoir 144 for further processing. As shown, liquor removed by the first filter 134 is provided to the recycling reservoir 144 through a first drain passage 146. The second filter 136 is primarily used to absorb the vapor or gas-phase components of the pickling liquor into water, thus removing them from the gas 118. The second filter recirculates liquid from a sump defined therewithin continuously through the top of the filter via a recirculation passage 157. A mixture of excess water and pickling liquor draining out of the second filter 136 is provided to the recycling reservoir 144 via a second drain passage 148.

Pickling liquor in the recycling reservoir 144 has a relatively high concentration of ferric chloride in solution, and is removed periodically for further processing to retrieve the ferric chloride. The majority of ferric chloride is provided to the recycling reservoir 144 from the first drain passage 146. Thus, in an alternate embodiment, each of the first and second drain passages 146 and 148 may be connected to a dedicated tank (not shown) for collection of liquids from the filtering process. In this arrangement, fluid collecting in the tank that is connected to the first drain passage 146 may have a higher concentration of ferric chloride than the liquid connecting in the tank that is connected to the second drain passage 148.

A mixing tank 150 is connected to a fresh liquid reservoir 154 via a fresh liquor supply conduit 156, and to a water supply (not shown). During operation, a controller (not shown) having information available about the concentration of pickling liquor in the mixing tank 150 appropriately controls the mixing of determined amounts of water and fresh pickling liquor. These are mixed within the mixing tank 150 to yield a mixture of water, pickling liquor, and/or other components having a predetermined or desired composition, and then pumped from the mixing tank 150 into the supply line 110 by a pump 158. As previously discussed, the supply line 110 provides the mixture to the sprayers 108, and the entire process is repeated continuously during operation.

Figure 3:
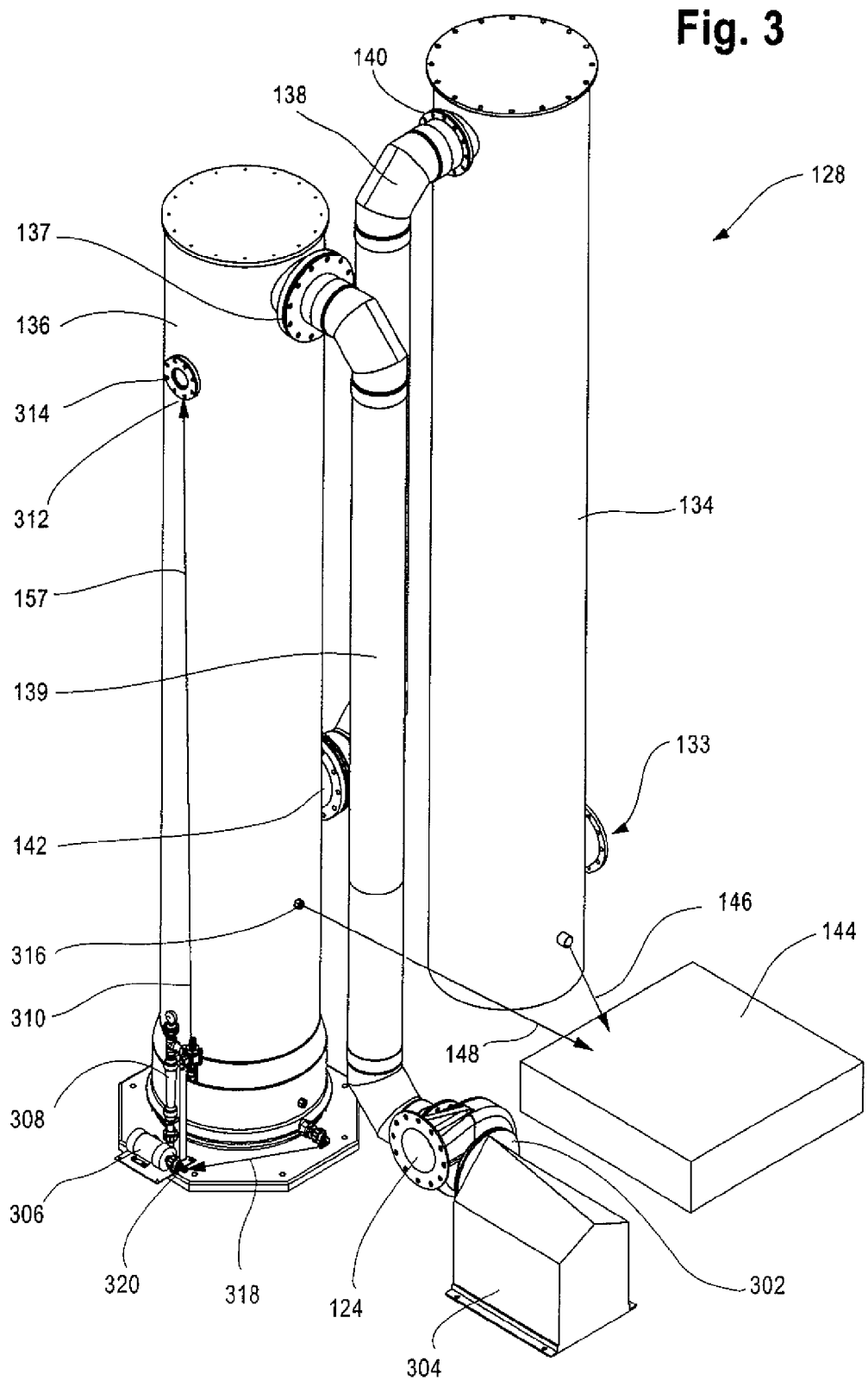
FIG. 3 is an outline view of the filtering arrangement in accordance with the disclosure.

An outline view of the filter arrangement 128 with surrounding components removed for clarity is shown in FIG. 3. In the discussion that follows, elements and structures that are the same or similar as those previously described are denoted by the same reference numerals as previously used for simplicity. In the illustrated view the first filter 134 appears on the right side of the figure and the second filter 136 appears on the left side of the figure. The pump 124 is shown connected to the outlet conduit 139 and, as illustrated, is a gas compressor or blower. As is known, gas compressors include a housing having a scroll passage formed therein. The housing surrounds a compressor wheel that forms a plurality of blades or vanes. Rotation of the compressor wheel pushes a fluid entering the housing via an inlet opening through the scroll passage. The fluid then exits the housing through an outlet opening.

Figure 2:
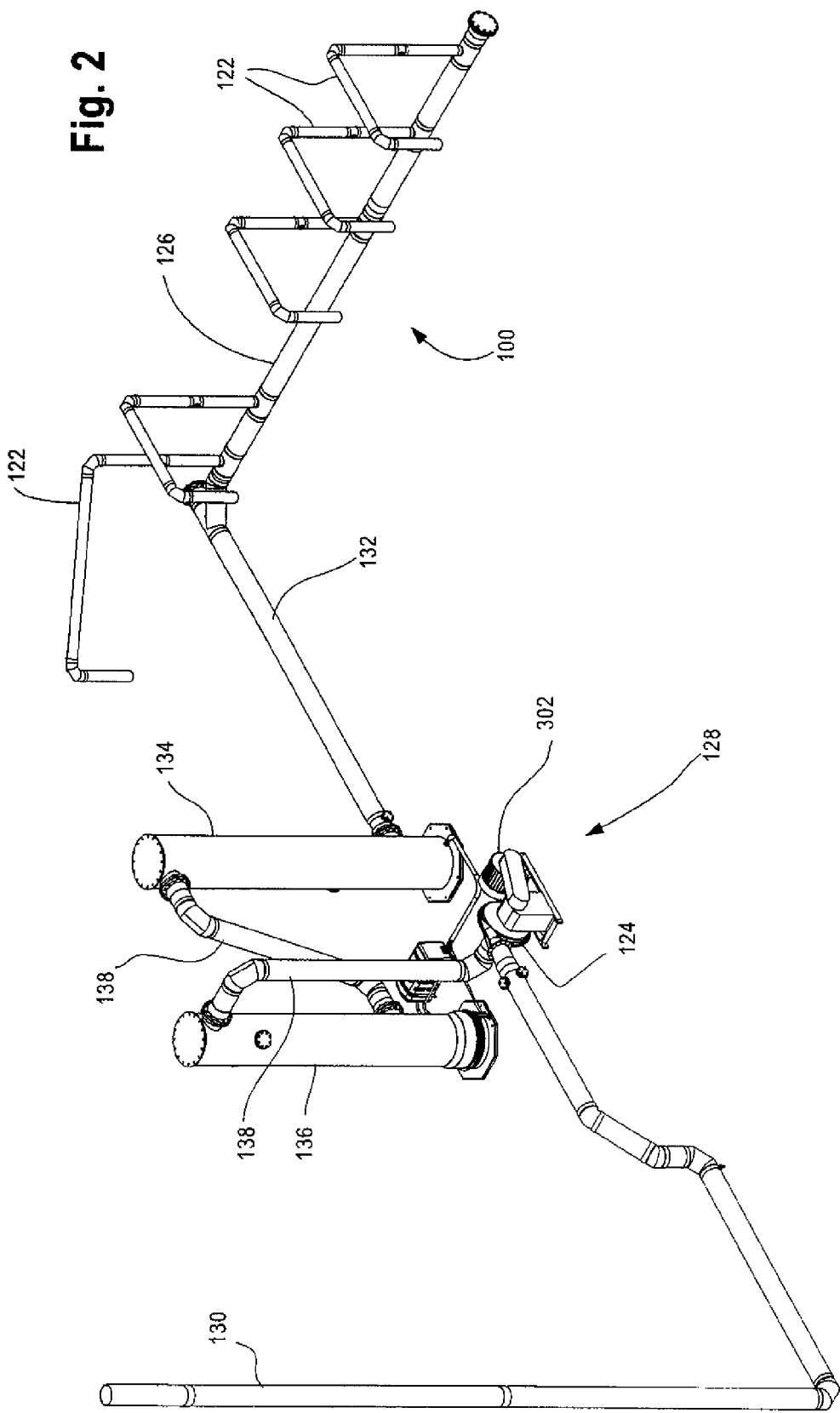
FIG. 2 is a perspective view of the recovery arrangement for the pickling process in accordance with the disclosure.

Operating in a similar fashion, the pump 124 is connected to and driven by an electric motor 302 (FIG. 2) that is enclosed by a cover 304. The cover 304 protects the motor 302 and its associated electronic components and electrical connections from liquids and other debris that may be present in its operating environment.

In the disclosed embodiment, the second filter 136 includes a water supply system for use during the filtration process. The water supply system includes a water tank 306 and a water metering device 308 that are capable of supplying a stream of water to the second filter 136 at a predetermined flow rate, for example, 2.5 gallons per minute (9.46 liters per minute). The water stream is provided toward the top of the second filter 136 via a water inlet line 310. The water inlet line 310 extends from the metering device 308 up to a water inlet port 312, which is disposed adjacent a viewing window 314. Water from the stream trickles internally toward the bottom of the second filter 136 and absorbs, in vapor solution, pickling liquor vapors from the gas 118. The water stream then exits from a water outlet port 316 located towards the bottom of the second filter 136 and a portion of it enters the second drain passage 148. A remaining portion of the water flow is returned to the water tank 306 via a water return line 318 by action of a water pump 320 disposed in line along the water return line 318.

A cross section through the first filter 134 is shown in FIG. 4. The first filter 134 includes a tower housing 402, which in the illustrated embodiment has a diameter of about 30 inches (0.762 meters), a height of about 17.5 feet (5.34 meters), and is made of a polyvinylchloride (PVC) material. The tower housing 402 has a generally tubular, cylindrical shape that is closed on either end by end-caps 403. Each of the inlet and outlet 133 and 140 is made of one-foot diameter PVC ducts, each of which is connected to the tower housing 402 by sealed flanges 404 using seals that are resistant to the pickling liquor, for example, rubberized ethylene propylene (EPDM). In the illustrated embodiment, the first filter 134 encloses a single cylindrical candle filter element 406, which extends concentrically along a generally upper portion of the tower housing 402.

The candle filter element 406 may be made of a porous ceramic or any other appropriate material that is arranged to permit passage of gaseous molecules therethrough but not larger particles such as mist or fog. The candle filter element 406 is arranged for a radially inward flow of gas 118. More particularly, gas 118 enters the tower housing 402 during operation via the inlet 133. The internal volume of the tower housing 402, which includes the candle filter element 406, is separated into an outer, unfiltered portion 408 extending between the tower housing 402 and the outer surface of the candle filter element 406, and an inner, filtered portion 410. The inner, filtered portion 410 is defined within the candle filter element 406 and an upper header portion 412. The upper header portion 412 extends between an upper, closed end 414 of the candle filter element 406 and the top end cap 403. In the illustrated embodiment, the candle filter element 406 includes a top flange 416, which rests on a corresponding flange of the tower housing, thus suspending the candle filter element 406 concentrically within the tower housing 402.

An internal drain pipe 418 extends from the bottom of the candle filter element 406 to about one inch (2.54 centimeters) from the bottom end cap 403 of the tower housing 402. The internal drain pipe 418 fluidly connects the filtered portion 410 with the unfiltered portion 408 such that, during operation, liquids coagulating on the outside and on the inside surfaces of the candle filter element 406 can drain and collect at the bottom of the tower housing 402 so they can be removed via the first drain passage 146. A fluid level switch 420 may activate an alert if the level of liquid collected at the bottom of the tower housing 402 rises beyond a predetermined level.

During operation, gas 118 carrying about 1160 PPM of acid fog or mist enters the first filter 134 via the inlet 133 and occupies the unfiltered portion 408 thus surrounding the candle filter element 406. The gas 118 is drawn through the candle filter element 406 in a radially inward direction by a lower pressure present at the outlet 140. The lower pressure at the outlet 140 is created by the pump 124 (FIG. 1), which is disposed downstream of the outlet 140. As the gas 118 passes through the candle filter element 406, the porosity in the filter material causes the fog or mist particles of pickling liquid to collect on the outer and/or inner surfaces of the candle filter element 406. The collection of liquid on the filter element 406 causes liquid droplets that are initially small but that also progressively grow to form a "sweat" on the filter element 406. When the weight of each droplet overcomes the surface tension holding the droplet on the filter, each droplet will fall toward the bottom of the tower housing 402 where the collected liquid can be removed.

A cross section through the second filter 136 is shown in FIG. 5. Much like the first filter 134, the second filter 136 includes a tower housing 502 that is capped on both ends by end caps 503. The inlet and outlets 142 (FIG. 2) and 137 are connected to the tower housing 502 by sealed flange connections 504. Gas 118, which has already passed through the first filter 134, enters the tower housing 502 at a lower chamber 506 and travels upwards through the tower housing 502 toward the outlet 137.

As previously described, the second filter 136 is a tray-type filter. In the illustrated embodiment, there are five tray filter stages, each including a sieve tray 508 disposed sequentially along the length of the tower housing 502. The sieve trays are supported at various intervals by two sieve tray support rods 510, each of which is connected to the tower housing 502 at a support beam 512. An absorption volume 514 is disposed above each sieve tray 508. Pipe segments 516, each extending through a corresponding sieve tray 508 and collectively with the other pipe segments 516 defining a winding path for gas through the filter, are disposed, one each, on alternating sides of the tower housing 502 within each absorption volume 514. Finally, a mist eliminator 518 is disposed over the sieve trays 508 separating an outlet header portion 520 of the filter from the outlet 137.

The water inlet line 310 is connected to a water spray spigot 522, which is disposed within the tower housing 502 above the topmost sieve tray 508. During operation, water sprayed into the tower housing 502 from the water spray spigot 522 trickles down the tower housing 502 through the successive sieve trays 508. The sieve trays 508 essentially maintain a uniform distribution of water drops falling though the tower housing 502 while also delaying the flow of water to the bottom of the tower housing 502. The increased surface area of water droplets passing through the tower housing 502 absorbs pickling liquor vapors from the gas 118 that is moving upwards through the tower housing 502. The water, which by the time it reaches the bottom of the tower housing 502 contains an increased concentration of the pickling liquor vapors it collected on the way down along the tower housing 502, is collected and removed through the water outlet 318. An overflow sensor 523 alerts of an excessive liquid level in the tower housing 502. An overflow conduit 524 may be used to remove excess liquid.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filtering process for removing a pickling liquor from a gas including a two-stage filtering process having:
    a two-stage filtering arrangement for removing the pickling liquor from a gas, present in a fog or mist form as well as in aerosol solution said filtering arrangement comprising:
        a first stage candle filter arranged to remove a liquid phase of said pickling liquor from said gas; and
        a second stage tray filter arranged to remove a gaseous phase of said pickling liquor from said gas;
    the steps comprising:
        collecting the gas containing quantities of pickling liquor from a pickling process;
        passing said gas through said first stage candle filter;
        passing said gas through said second stage tray filter after passing said gas through said sail first stage candle filter;
        collecting said pickling liquor from said two-stage filter arrangement;
        returning said collected pickling liquor to said process.

2. A two-stage filtering arrangement for removing a pickling liquor from a gas, the pickling liquor being present in a fog or mist form as well as in aerosol solution in the gas, the filtering arrangement comprising:
    a first stage candle filter arranged to remove a liquid phase of said pickling liquor from said gas; and
    a second stage tray filter disposed in series downstream from said first stage candle filter and arranged to remove a gaseous phase of said pickling liquor from said gas.

3. The two-stage filtering arrangement of claim 2, wherein the first stage filter contains at least one candle filter element operating to separate pickling liquor droplets from the gas such that said droplets coagulate and collect at a bottom portion of said first stage filter.

4. The two-stage filtering arrangement of claim 2 wherein said second stage filter contains two or more sieve trays disposed sequentially along the filter, and wherein a spray of water trickles down the filter over the two or more sieve trays absorbing pickling, liquor vapors from the gas.

5. The two-stage filtering arrangement of claim 4, wherein a supply of water is provided to the second stage filter, and wherein the supply of water is substantially less than a corresponding supply of water in a known single-stage filtering arrangement having a tray filter.

6. The two-stage filtering arrangement of claim 4 wherein the water supplied to the second stage tray filter is supplied at about two and one half gallons per minute (2.5 gal./min.).

7. The two-stage filtering arrangement of any of claims 2 to 6 wherein said pickling liquor comprises a concentrate of hydrochloric acid in water.

8. The two-stage filter arrangement of claim 7 wherein the concentration of hydrochloric acid is about 6%.

* * * * *

UNITED STATES PATENT AND TRADEMARK OFFICE
CERTIFICATE OF CORRECTION

| | | |
|---|---|---|
| PATENT NO. | : 8,597,433 B2 | Page 1 of 1 |
| APPLICATION NO. | : 12/749090 | |
| DATED | : December 3, 2013 | |
| INVENTOR(S) | : Peter Gubricky et al. | |

It is certified that error appears in the above-identified patent and that said Letters Patent is hereby corrected as shown below:

In the Claims:

Column 7, line 36 (Claim 1, line 16) after "said" delete "sail"

Column 8, line 22 (Claim 4, line 5) after "pickling" delete ","

Signed and Sealed this
Twenty-second Day of April, 2014

Michelle K. Lee
*Deputy Director of the United States Patent and Trademark Office*